(12) United States Patent
Czaplicki et al.

(10) Patent No.: US 6,321,793 B1
(45) Date of Patent: Nov. 27, 2001

(54) BLADDER SYSTEM FOR REINFORCING A PORTION OF A LONGITUDINAL STRUCTURE

(75) Inventors: Michael J. Czaplicki, Rochester; Thomas L. Coon, Lapeer, both of MI (US)

(73) Assignee: L&L Products, Romeo, MI (US)

( * ) Notice: Subject to any disclaimer, the term of this patent is extended or adjusted under 35 U.S.C. 154(b) by 0 days.

(21) Appl. No.: 09/591,877

(22) Filed: Jun. 12, 2000

(51) Int. Cl.$^7$ .................................................. F16L 55/12
(52) U.S. Cl. .............................. 138/93; 138/172; 138/89
(58) Field of Search .................... 138/93, 89, 90, 138/172; 296/205

(56) References Cited

U.S. PATENT DOCUMENTS

| | | | |
|---|---|---|---|
| 1,814,677 | * 7/1931 | Fennema | 138/93 |
| 3,054,636 | 9/1962 | Wessells, III . | |
| 3,123,170 | 3/1964 | Bryant . | |
| 3,493,257 | 2/1970 | Fitzgerald et al. . | |
| 3,665,968 | 5/1972 | DePutter . | |
| 3,746,387 | 7/1973 | Schwenk . | |
| 3,757,559 | 9/1973 | Welsh . | |
| 3,890,108 | 6/1975 | Welsh . | |
| 4,019,301 | 4/1977 | Fox . | |
| 4,029,128 | * 6/1977 | Yamagishi | 138/93 X |
| 4,082,825 | 4/1978 | Puterbaugh . | |
| 4,083,384 | * 4/1978 | Horne et al. | 138/93 |
| 4,090,734 | 5/1978 | Inami et al. . | |
| 4,238,540 | 12/1980 | Yates et al. . | |

(List continued on next page.)

FOREIGN PATENT DOCUMENTS

| | | |
|---|---|---|
| 2919046 | 5/1979 | (DE) . |
| G9011147.8 | 9/1990 | (DE) . |
| 4028895C1 | 2/1992 | (DE) . |
| G9320333.0 | 6/1994 | (DE) . |
| 19858903A1 | 6/2000 | (DE) . |
| 82102135.9 | 3/1982 | (EP) . |
| 90202150.0 | 8/1990 | (EP) . |
| 91104546.6 | 3/1991 | (EP) . |
| 94101343.5 | 1/1994 | (EP) . |
| 95913082.4 | 3/1995 | (EP) . |
| 0 891 918 A1 | 1/1999 | (EP) . |
| 0 893 331 A1 | 1/1999 | (EP) . |
| 0 893 332 A1 | 1/1999 | (EP) . |
| 2749263A1 | 5/1996 | (FR) . |
| 628863 | 3/1947 | (GB) . |
| 8028960 | 9/1980 | (GB) . |
| 8725028 | 10/1987 | (GB) . |
| 61118211 | 6/1986 | (JP) . |
| 64-69308 | 3/1989 | (JP) . |

(List continued on next page.)

OTHER PUBLICATIONS

PCT WO 99/08854 Harrison et al. Publication Date Feb. 25, 1999.*
PCT WO 00/13958 Wycech, Publication Date Mar. 16, 2000.*
PCT WO 99/61289 Wycech, Publication Date Dec. 2, 1999.*
PCT WO 00/41916 Wycech, Publication Date Jul. 20, 2000.*

*Primary Examiner*—Patrick Brinson
(74) *Attorney, Agent, or Firm*—Dobrusin & Thennisch PC

(57) ABSTRACT

A bladder system and method for reinforcing at least a portion of a structural member, including a flexible barrier member for dividing at least a portion of the structural member being reinforced into one or more sections; and a reinforcement material for filling one or more sections bounded by the flexible barrier member. The reinforcement material filling one or more sections of the structural member can be a pumpable polymeric material, and the flexible barrier member can be a polymeric material.

22 Claims, 2 Drawing Sheets

U.S. PATENT DOCUMENTS

| | | |
|---|---|---|
| 4,378,395 | 3/1983 | Asoshina et al. . |
| 4,397,490 | 8/1983 | Evans et al. . |
| 4,440,434 | 4/1984 | Celli . |
| 4,457,555 | 7/1984 | Draper . |
| 4,559,274 | 12/1985 | Kloppe et al. . |
| 4,610,836 | 9/1986 | Wycech . |
| 4,613,177 | 9/1986 | Loren et al. . |
| 4,705,716 | 11/1987 | Tang . |
| 4,732,806 | 3/1988 | Wycech . |
| 4,751,249 | 6/1988 | Wycech . |
| 4,762,352 | 8/1988 | Enomoto . |
| 4,803,108 | 2/1989 | Leuchten et al. . |
| 4,836,516 | 6/1989 | Wycech . |
| 4,853,270 | 8/1989 | Wycech . |
| 4,861,097 | 8/1989 | Wycech . |
| 4,898,630 | 2/1990 | Kitoh et al. . |
| 4,901,500 | 2/1990 | Wycech . |
| 4,908,930 | 3/1990 | Wycech . |
| 4,917,435 | 4/1990 | Bonnett et al. . |
| 4,922,596 | 5/1990 | Wycech . |
| 4,923,902 | 5/1990 | Wycech . |
| 4,978,562 | 12/1990 | Wycech . |
| 4,989,913 | 2/1991 | Moore, III . |
| 4,995,545 | 2/1991 | Wycech . |
| 5,102,188 * | 4/1992 | Yamane ................................ 296/205 |
| 5,122,398 | 6/1992 | Seiler et al. . |
| 5,124,186 | 6/1992 | Wycech . |
| 5,213,391 | 5/1993 | Takagi . |
| 5,255,487 | 10/1993 | Wieting et al. . |
| 5,266,133 | 11/1993 | Hanley et al. . |
| 5,344,208 | 9/1994 | Bien et al. . |
| 5,373,027 | 12/1994 | Hanley et al. . |
| 5,395,135 | 3/1995 | Lim et al. . |
| 5,506,025 | 4/1996 | Otto et al. . |
| 5,560,672 | 10/1996 | Lim et al. . |
| 5,575,526 * | 11/1996 | Wycech ................................ 296/205 |
| 5,580,120 | 12/1996 | Nees et al. . |
| 5,642,914 | 7/1997 | Takabatake . |
| 5,648,401 | 7/1997 | Czaplicki et al. . |
| 5,649,400 | 7/1997 | Miwa . |
| 5,652,039 | 7/1997 | Tremain et al. . |
| 5,707,098 | 1/1998 | Uchida et al. . |
| 5,725,272 | 3/1998 | Jones . |
| 5,731,069 | 3/1998 | Delle Donne et al. . |
| 5,755,486 | 5/1998 | Wycech . |
| 5,766,719 | 6/1998 | Rimkus . |
| 5,785,376 | 7/1998 | Nees et al. . |
| 5,786,394 | 7/1998 | Slaven . |
| 5,803,533 | 9/1998 | Schulz et al. . |
| 5,804,608 | 9/1998 | Nakazato et al. . |
| 5,806,915 | 9/1998 | Takabatake . |
| 5,806,919 | 9/1998 | Davies . |
| 5,819,408 | 10/1998 | Catlin . |
| 5,855,094 | 1/1999 | Baudisch et al. . |
| 5,866,052 | 2/1999 | Muramatsu . |
| 5,878,784 * | 3/1999 | Sales et al. ............................ 138/93 |
| 5,884,960 | 3/1999 | Wycech . |
| 5,885,688 | 3/1999 | McLaughlin . |
| 5,888,600 | 3/1999 | Wycech . |
| 5,888,642 | 3/1999 | Meteer et al. . |
| 5,901,528 | 5/1999 | Richardson . |
| 5,901,752 * | 5/1999 | Lundman ............................ 138/93 |
| 5,904,024 | 5/1999 | Miwa . |
| 5,932,680 | 8/1999 | Heider . |
| 5,934,737 | 8/1999 | Abouzahr . |
| 5,941,597 | 8/1999 | Horiuchi et al. . |
| 5,984,389 | 11/1999 | Nuber . |
| 5,985,435 | 11/1999 | Czaplicki et al. . |
| 5,988,734 | 11/1999 | Longo et al. . |
| 5,992,923 | 11/1999 | Wycech . |
| 5,994,422 | 11/1999 | Born et al. . |
| 6,003,274 | 12/1999 | Wycech . |
| 6,004,425 | 12/1999 | Born et al. . |
| 6,022,066 | 2/2000 | Tremblay et al. . |
| 6,050,630 | 4/2000 | Hochet . |
| 6,053,210 * | 4/2000 | Chapman et al. ................ 138/93 X |
| 6,058,673 | 5/2000 | Wycech . |
| 6,059,342 | 5/2000 | Kawai et al. . |
| 6,068,424 | 5/2000 | Wycech . |
| 6,077,884 | 6/2000 | Hess et al. . |
| 6,079,180 | 6/2000 | Wycech . |
| 6,082,811 | 7/2000 | Yoshida . |
| 6,090,232 | 7/2000 | Seeliger et al. . |
| 6,092,864 | 7/2000 | Wycech et al. . |
| 6,094,798 | 8/2000 | Seeliger et al. . |
| 6,096,403 | 8/2000 | Wycech et al. . |
| 6,096,791 | 8/2000 | Born et al. . |
| 6,099,948 | 8/2000 | Paver, Jr. . |
| 6,102,379 | 8/2000 | Ponslet et al. . |
| 6,102,473 | 8/2000 | Steininger et al. . |
| 6,103,341 | 8/2000 | Barz et al. . |
| 6,103,784 | 8/2000 | Hilborn et al. . |
| 6,110,982 | 8/2000 | Russick et al. . |
| 6,129,410 | 10/2000 | Kosaraju et al. . |
| 6,131,897 | 10/2000 | Barz et al. . |
| 6,135,542 | 10/2000 | Emmelmann et al. . |
| 6,149,227 | 11/2000 | Wycech . |
| 6,150,428 | 11/2000 | Hanley, IV et al. . |
| 6,152,260 | 11/2000 | Eipper et al. . |
| 6,153,709 | 11/2000 | Xiao et al. . |
| 6,165,588 | 12/2000 | Wycech . |
| 6,168,226 | 1/2001 | Wycech . |

FOREIGN PATENT DOCUMENTS

| | | |
|---|---|---|
| 64-69309 | 3/1989 | (JP) . |
| 01164867 | 6/1989 | (JP) . |
| 2-206537 | 8/1990 | (JP) . |
| 5-38992 | 2/1993 | (JP) . |
| PCT/JP88/00029 | 1/1988 | (WO) . |
| PCT/AU92/00468 | 9/1992 | (WO) . |
| PCT/EP95/00896 | 3/1995 | (WO) . |
| PCT/US95/05749 | 5/1995 | (WO) . |
| PCT/US96/11155 | 7/1996 | (WO) . |
| PCT/US97/10693 | 6/1997 | (WO) . |
| PCT/US97/07644 | 11/1997 | (WO) . |
| PCT/US97/19981 | 11/1997 | (WO) . |
| PCT/US98/08980 | 5/1998 | (WO) . |
| PCT/US98/16461 | 8/1998 | (WO) . |
| PCT/US98/17994 | 9/1998 | (WO) . |
| PCT/US99/00035 | 1/1999 | (WO) . |
| PCT/US99/00770 | 1/1999 | (WO) . |
| PCT/US98/16461 | 2/1999 | (WO) . |
| PCT/US99/01855 | 2/1999 | (WO) . |
| PCT/US99/01865 | 2/1999 | (WO) . |
| PCT/US99/ | | |

| Publication No. | Date | Country |
|---|---|---|
| PCT/US99/04263 | 3/1999 | (WO). |
| PCT/US99/04279 | 3/1999 | (WO). |
| PCT/CA99/00424 | 5/1999 | (WO). |
| PCT/US99/10441 | 5/1999 | (WO). |
| PCT/US99/11109 | 5/1999 | (WO). |
| PCT/US99/11110 | 5/1999 | (WO). |
| PCT/US99/11194 | 5/1999 | (WO). |
| PCT/US99/11195 | 5/1999 | (WO). |
| PCT/EP99/03832 | 6/1999 | (WO). |
| PCT/EP99/06112 | 8/1999 | (WO). |
| PCT/US99/18820 | 8/1999 | (WO). |
| PCT/EP99/07143 | 9/1999 | (WO). |
| PCT/US99/18832 | 9/1999 | (WO). |
| PCT/US99/24795 | 10/1999 | (WO). |
| PCT/DE99/04103 | 12/1999 | (WO). |
| PCT/EP99/09541 | 12/1999 | (WO). |
| PCT/EP99/09732 | 12/1999 | (WO). |
| PCT/EP99/09909 | 12/1999 | (WO). |
| PCT/EP99/10151 | 12/1999 | (WO). |
| PCT/US99/29986 | 12/1999 | (WO). |
| PCT/US99/29987 | 12/1999 | (WO). |
| PCT/US99/29990 | 12/1999 | (WO). |
| PCT/US99/29991 | 12/1999 | (WO). |
| PCT/US99/29992 | 12/1999 | (WO). |
| PCT/EP00/00021 | 1/2000 | (WO). |
| PCT/US00/00010 | 1/2000 | (WO). |
| PCT/US00/00497 | 1/2000 | (WO). |
| PCT/US00/01644 | 1/2000 | (WO). |
| PCT/EP00/01474 | 2/2000 | (WO). |
| PCT/US00/02631 | 2/2000 | (WO). |
| PCT/AT00/00123 | 5/2000 | (WO). |
| WO 00/37302 | 6/2000 | (WO). |

\* cited by examiner

BLADDER SYSTEM FOR REINFORCING A PORTION OF A LONGITUDINAL STRUCTURE

FIELD OF THE INVENTION

The present invention relates to a bladder system for reinforcing a portion of a structural member. More particularly, the present invention relates to a bladder system for reinforcing a portion of a structural member having either an open or closed center portion, wherein the bladder system includes a flexible barrier member and a reinforcing material.

BACKGROUND OF THE INVENTION

Prior barrier systems used for reinforcing a portion of a structural member having an open center using a two component pumpable product have included a metal or rigid barrier member placed within the open center. In many instances, the structural nature of the barrier member limited the applications for which the barrier system could be used. For instance, the structure and location of the member being reinforced made it difficult to insert a barrier member therein after the structural member had been incorporated into a frame system, e.g., an automobile frame. For example, once an automobile has been completed or partially assembled, the insertion of a barrier member into the center portion of a cavity of a structural member is often difficult and time consuming. Thus, there is needed a system and method that will permit local reinforcement of a structure at various stages throughout the manufacturing or assembly process concerning the member being reinforced.

SUMMARY OF THE INVENTION

The present invention is directed to a bladder system for reinforcing at least a portion of a structural member. The bladder system includes a flexible barrier member for dividing at least a portion of the structural member into one or more sections; and a reinforcement material for filling one or more sections bounded by the flexible barrier member. The reinforcement material filling one or more sections of the structural member is a material that can be pumped, and the flexible barrier member is a polymeric material, that may or may not have adhesive characteristics.

The flexible barrier membrane is a thermosetting polymer with cure characteristics that may be activated in a variety of ways. For example heat, catalyst, or a combination of two or more chemically reactive ingredient may be used to activate the polymer.

The invention is also directed to a method for using the bladder system. The method for reinforcing at least a portion of a structural member having either an open or closed center, includes the steps of providing a structure; supporting a flexible barrier member along a portion of the structural member for dividing the area of the structural member into one or more sections; and filling one or more of the sections of the structural member with the reinforcement material.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

The bladder system of the present invention generally includes a flexible barrier member and a reinforcing material retained by at least a portion of the flexible barrier member. In general application, the bladder system can be used to reinforce a portion of a structural member having either an open or closed center by inserting the flexible barrier member within the interior or along an exterior surface of the structure to be reinforced. The flexible barrier member thus divides the area to be reinforced into identifiable sections. Once the flexible barrier member is in place, a reinforcement material such as a polymer-based liquid, solid or semi-solid material, is received in one or more of the sections bounded by the flexible barrier member, which sections can include the area of the cavity defined by expanding the flexible member with the reinforcement material.

In a preferred embodiment, the bladder system can be used to reinforce a portion of a structural member having a hollow center. The flexible barrier member is inserted into the open center or cavity such that the flexible barrier member divides the cavity into one or more sections, and the reinforcement material is received in one or more of the sections.

FIGS. 1, 2, 3, 4, 6, and 7b show a cross-sectional view of a bladder system 10 formed in accordance with the teachings of this invention. The bladder system 10 includes a flexible barrier member 12 and a reinforcement material 14.

Figure 2:
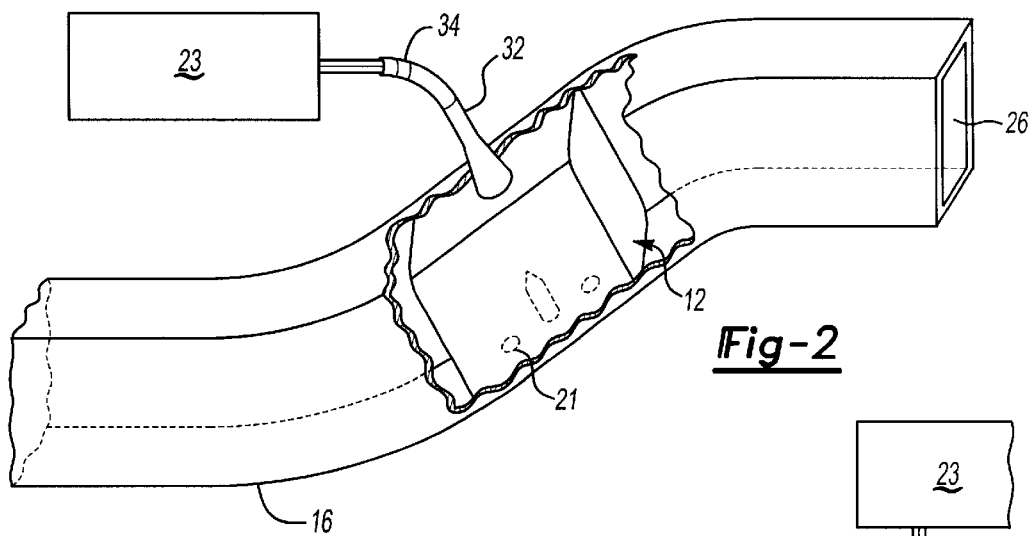
FIG. 2 shows a cross-section of another embodiment of a bladder system formed in accordance with the teachings of this invention.
Figure 7A:
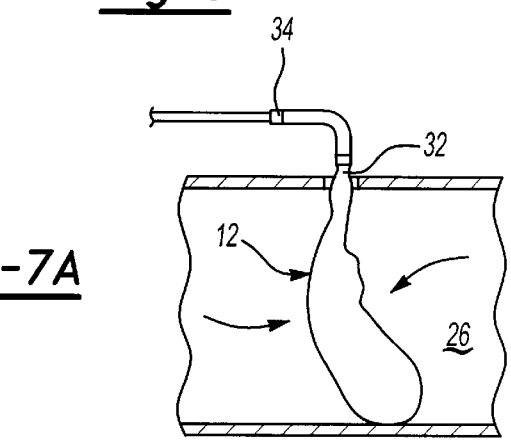
FIG. 7a shows the flexible barrier member of this invention coupled to a fill valve.
Figure 7B:
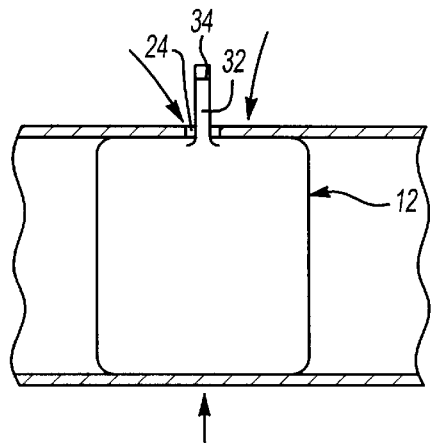
FIG. 7b shows the flexible barrier member of FIG. 7a after inflation.

Turing now to the embodiment shown in FIG. 2, the flexible barrier member 12 can be an inflatable, flexible bag-like structure. One of skill in the art will appreciate that the structure of the flexible bag-like structure resembles that of a balloon as shown in FIGS. 7a, 7b. In the embodiment of FIG. 2, the flexible barrier member 12 includes a hollow center surrounded by a porous outer membrane. The porous outer membrane permits the flexible barrier member 12 upon inflation to conform to the shape of the area being reinforced. The bag-like structure can also include an integral neck portion 32 having an end portion 34 for coupling the flexible bag-like structure to a fluid pumping system for filling the interior of the flexible barrier member 12.

The porous membrane of the barrier member 12 can include perforations 21 located therein to allow adhesive to bleed through the bag and adhere to adjacent surfaces. Alternatively, the bag may be made of structural adhesive that is flexible, such structure would permit elimination of the perforations.

Figure 1:
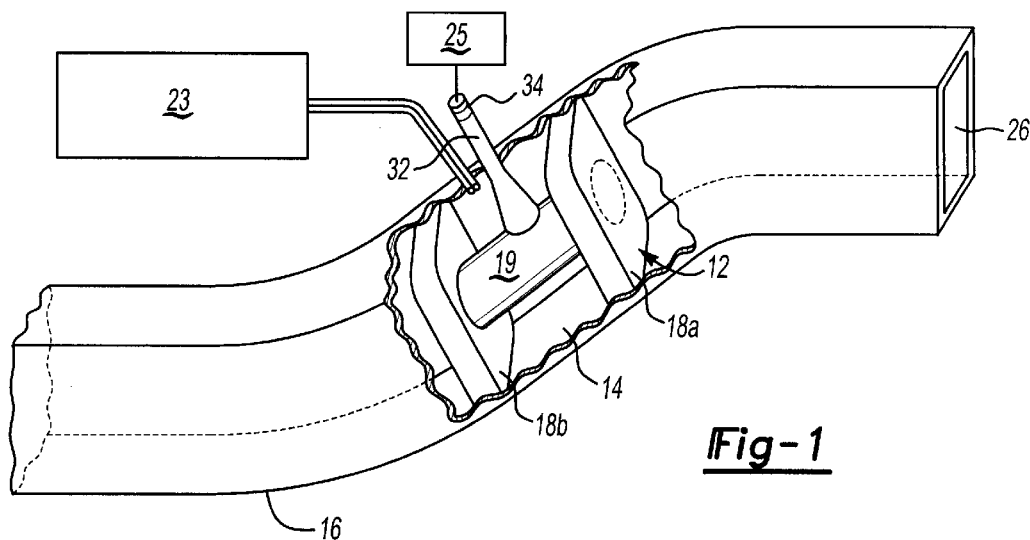
FIG. 1 is a cross-section showing the bladder system formed in accordance with the teachings of this invention placed in a longitudinal cavity.

Another embodiment of a bag-like structure for the flexible barrier member is shown in FIG. 1. This embodiment includes two end members 18a, 18b joined by a center portion 19 which is in fluid communication which each end portion. The center portion includes a neck portion 32 that supports an end 34 for receiving a fluid under pressure for filling the center of the flexible barrier member 12.

Figure 3:
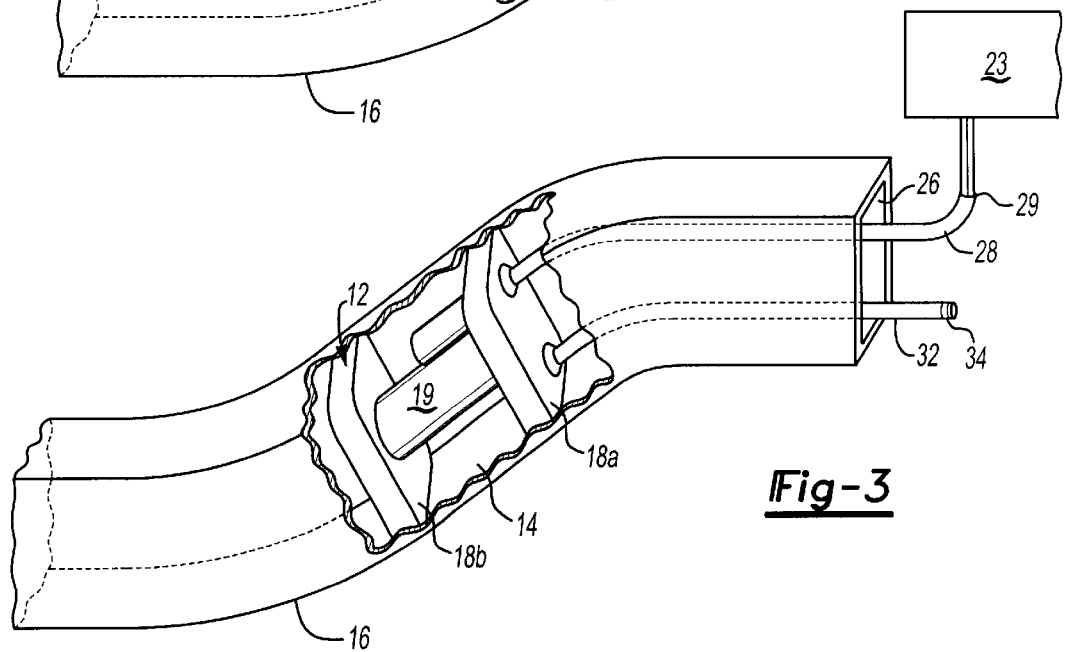
FIG. 3 illustrates still another embodiment of a bladder system formed in accordance with the teachings of this invention.

A third embodiment of the flexible barrier member 12 is shown in FIG. 3. In this embodiment, the flexible barrier member 12 includes two end members 18a, 18b joined together by a center portion 19 in fluid communication with each of the end portions 18a, 18b. One of the end portions 18a supports a neck 32 and end 34, wherein the end 34 can be connected to a pumping system for filling the interior of the flexible barrier member 12 with a fluid under pressure. This end portion 18a also supports a neck 28 and end 29, wherein the end 29 can be coupled to a second fluid pumping system.

Figure 4:
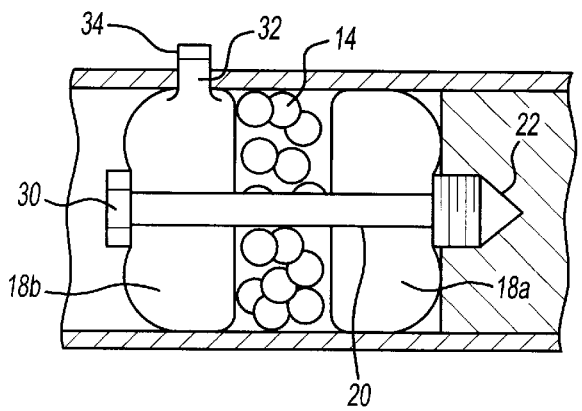
FIG. 4 illustrates a fourth embodiment of a bladder system formed in accordance with the teachings of this invention, wherein the reinforcement material is undergoing curing.

FIG. 4 shows a fourth embodiment of the flexible barrier member 12. In this embodiment, the flexible barrier member 12 is a two-piece movable structure. Each movable portion 18a, 18b is supported by a rod 20. One end of the rod 20 supports a pin head 30 and the opposite end supports a nut 22 or other similar device.

Figure 6:
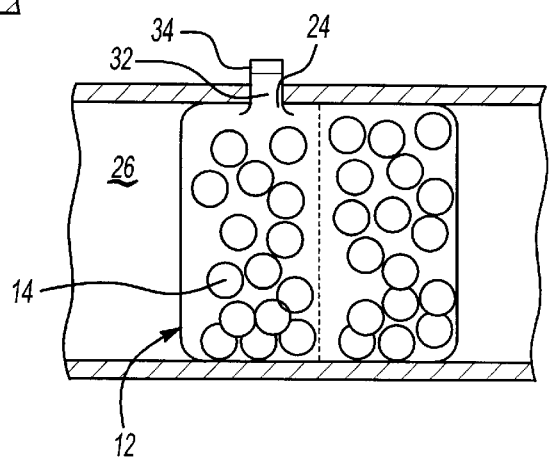
FIG. 6 illustrates another embodiment of a bladder system formed in accordance with the teachings of this invention.

FIG. 6 shows still another embodiment of the flexible barrier member 12. In this embodiment, the flexible barrier member 12 is a single sheet of a flexible material. In the embodiment, the flexible barrier member 12 includes two single flexible sheets spaced a distance apart.

The above described embodiments of the flexible barrier member 12 merely illustrate the various forms in which the barrier member 12 can be constructed. One of ordinary skill in the art will appreciate that many other configurations and constructions of the barrier member 12 may be used in practicing the invention. For instance, the flexible barrier member 12 could be a reservoir for retaining the reinforcement material 14, or the flexible barrier member 12 could be used to meter/control flow of the reinforcement material 14 past the boundary of the flexible barrier member 12.

The flexible barrier member 12 can be a polymeric material such as an elastomer, polyethylene, ethylene-vinyl acetate copolymer, plasticized polyvinyl chloride film, polyamide, or various olfenic copolymer or terpolymer materials. One of skill in the art will appreciate that the bladder system 10 can be used for a wide variety of applications. Thus, the choice of material selected for the flexible barrier member 12 will depend upon the environmental conditions under which the flexible barrier member 12 will be used.

In one embodiment, the flexible barrier member 12 can be used to reinforce a portion of an automobile frame during initial assembly or in the automobile after market in body or paint shop applications during repair operations. In the aforementioned applications, the flexible barrier member 12 can be exposed to temperatures ranging from approximately 93° C. (200° F.) to approximately 204° C. (400° F.). In still another embodiment, the flexible barrier member 12 can be used in low temperature operations, including applications at subzero temperatures. Thus, the material selected for forming the flexible barrier member 12 should possess thermal properties that will permit the flexible barrier member 12 to maintain its structural integrity at a predetermined temperature or over a predetermined temperature range.

One of skill in the art will also appreciate that the size and specific physical dimensions of the flexible barrier member 12 will vary depending on the physical dimensions of the area to be reinforced.

Turning now to a discussion of the reinforcement material 14, the reinforcement material 14 can be any material that can be dispensed as a liquid, solid, or semi-solid material and later reacted or cured to create a substantially fused member. From a chemical standpoint, the reinforcement material 14 can be processed as a liquid prepolymer or a thermoplastic material before curing, and in one embodiment, after curing the reinforcement material can become thermoset. The preferred material is a polymeric material, with the most preferred material being a polymeric material that becomes thermoset after curing. Materials that can be used to form the reinforcement material 14 include, but are not limited to, epoxy, polyurethane, polyester, and acrylic based materials, which when compounded with appropriate ingredients may expand and cure in a reliable and predictable manner upon application of a curing stimulus. One of skill in the art will appreciate that various olfenic materials, elastomers, fluropolymers or other materials may be used to formulate the reinforcement material 14.

The reinforcement material 14 can be cured by reacting two or more materials that possess chemically reactive functional groups. Reaction can also be achieved by heating the reinforcement material 14 to a desired temperature, heating the reinforcement material 14 over a desired temperature range or by exposing the reinforcement material 14 to a predetermined change in ambient conditions. For example, the reinforcement material 14 can be cured by an induction heating application or by exposure to ambient conditions resulting in a change in atmospheric moisture conditions. In one embodiment, the reinforcement material 14 can be a thermally activated compound such that it expands upon exposure to a predetermined temperature.

As the reinforcement material 14 is cured, typically it expands to fill the area, or at least a portion of the area, to which it has been applied. Although this expansion provides structural benefits, it is not necessary. The reinforcement material 14 is formulated to permit the material 14 to adhere to adjacent surfaces. The adhesion and physical properties of the reinforcement material 14 are similar to that of known structural foams and other similar compounds known in the art.

As the reinforcement material 14 can be cured or caused to become chemically reactive upon exposure to certain environment and ambient conditions, an important consideration in selecting and formulating the material comprising the reinforcement material 14 is the temperature at which a chemical reaction or expansion, and possibly curing will take place. For instance, in most applications, it is undesirable for the reinforcement material 14 to become reactive unless triggered by combination of reactive components, application of heat, etc. As previously discussed, the reinforcement material 14 can be used in an automobile assembly plant or a body shop where it can be exposed to temperatures typically ranging from approximately 93° C. (200° F.) to approximately 204° C. (400° F.).

Upon curing, the strength and stiffness of the reinforcement material 14 are increased and the material is no longer capable of flowing. The strength and stiffness of the cured material help to increase the structural properties of article retaining the reinforcement material 14 without significantly adding to the overall weight of the article. Additionally, in the cured state, the reinforcement material 14, can have a density that does not add significantly to the weight of the article being reinforced.

Typically, the reinforcement material 14 is applied to an article to be reinforced at the desired point of reinforcement.

In one embodiment, the reinforcement material 14 is a system capable of being pumped. The pumping system can be of a type that is capable of dispensing the specific formulation of the reinforcement material 14 to the site of reinforcement. Pumping systems that can be used to accomplish this task include, but are not limited to, two-part static mix dispensing machines, two-part dynamic mixing machines, impingement systems, and pressurized material dispensing vessels. One of skill in the art will appreciate that pumping systems of the type used in dispensing paint, adhesive, and thermosetting polymer products can be used to dispense the reinforcement material 14. It will also be apparent to one of skill in the art that the type of dispensing machine chosen will depend on the nature of the chemical reaction required to cure the reinforcement material 14.

USE OF THE BLADDER SYSTEM

The bladder system 10 can be used to reinforce a structural membrane having either an open or closed center. Where the bladder system 10 is used with a structural member having a closed center, the method for using the bladder system can include supporting a flexible barrier member along a portion of the structural member for dividing the area of the structural member into one or more sections and filling one or more of the sections formed by the of the flexible barrier member 12 with a reinforcement material 12.

A similar method can be used in employing the bladder system 10 to reinforce a portion of a structural member having a hollow center. For example, the steps for reinforcing a structure having a hollow center can include inserting a flexible barrier member within the cavity (hollow center) for dividing the cavity into one or more sections and filling one or more sections of the cavity with a reinforcement material.

The embodiments shown in FIGS. 1–6 show use of the bladder system 10 to reinforce a structure having an open center. Referring to the embodiment of FIG. 1, a structure 16 having a hollow center 26 is provided. An opening 24 (best seen in FIGS. 5, 6, and 7b) is formed in a surface of the structure 16. The flexible barrier member 12 is inserted into the hollow center 26 by collapsing the sidewalls of the flexible barrier member 12 and forcing the flexible barrier member 12 through the opening 24 such that the neck portion 32 of the flexible barrier member 12 projects outwardly from the opening 24 as shown in FIGS. 1–2, 4–6, and 7b.

As shown in FIGS. 1 and 7(a)–7(b), a fluid valve 25 is coupled to the open end 34 of the neck portion 32 of the flexible barrier member 12, permitting a fluid under pressure to fill the interior of the flexible barrier member 12. One of skill in the art will appreciate that the fluid can be a gaseous mixture such as air. As the fluid fills the center of the flexible barrier member 12, the flexible barrier member 12 expands and fills at least a portion of the hollow center 26. This action, as shown in FIGS. 1–6, causes the area of the structural member 16 bounded by the flexible barrier member 12 to be divided into one or more distinct sections.

The reinforcement material 14 can be either pumped or injected, using known techniques, into one or more of the distinct sections formed by the flexible barrier member 12. As shown in FIG. 1, a fill valve 23 can be placed in the opening 24 adjacent the neck portion 32 of the flexible barrier member 12. The reinforcement material 14, in liquid or pellet form, is pumped into the portion of the hollow center 26 bounded by the flexible barrier member 12, as shown in FIGS. 1 and 3.

In the embodiment of FIGS. 1 and 3, the ends of the flexible barrier member 12 form a liquid tight seal with the surfaces adjacent the area to be reinforced so as to reduce the amount, if any, of the reinforcement material 14 that may flow past the edges of the flexible barrier member 12. The center portion of the flexible barrier member 12 is constructed to permit the reinforcement material 14 to flow downward into the bottom section formed by the flexible barrier member 12. One of skill in the art will appreciate that the opening 24 can be sealed using known techniques.

In another embodiment, the fluid valve is connected to the flexible barrier member 12, and the reinforcement material 14 is pumped directly into the flexible barrier member 12, causing it to expand as shown in FIG. 2 to fill the hollow center 26.

In still another embodiment, FIG. 3, the flexible barrier member 12 can have a construction similar to that shown in FIG. 1, except the flexible barrier member is inserted into the hollow center 26 of the longitudinal structure 16 from an open end of the structure 16. The neck portion 32 of the flexible barrier member 12 extends along the length of the structure 16 and is integrally formed as part of an end portion 18a of the flexible barrier member 12.

The end portion 18a also supports a second neck portion 33, which is placed in fluid communication with the portion of the hollow center 26 bounded by the flexible barrier member 12. As previously described, a fluid under pressure is pumped into the center of the flexible barrier member 12 through the neck portion 32, causing the flexible barrier member 12 to expand and fill a portion of the hollow center 26. Once the flexible barrier member 12 has been inflated, the reinforcement material 14 is pumped into the selected area to be reinforced through the second neck portion 28 and valve stem end 29.

Figure 5:
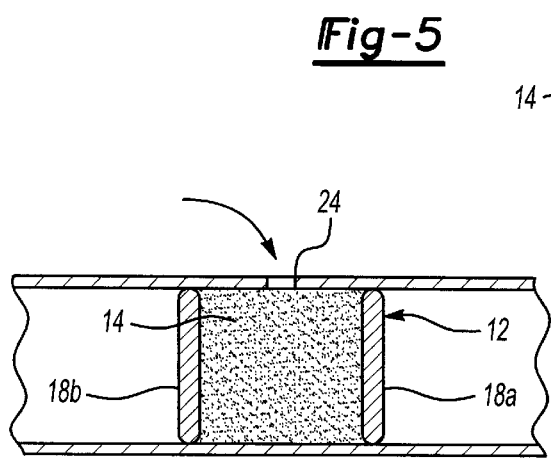
FIG. 5 shows the bladder system of FIG. 4 prior to curing the reinforcement material.

In still another embodiment, FIGS. 4–5, the flexible barrier member 12 includes at least two movable end portions 18a, 18b supported by a rod 20. The flexible barrier member 12 is inserted into the opening 26. The neck portion 32 of the flexible barrier member 12 is coupled to a pumping system and the reinforcement material 14 in the form of precast pellets is pumped into the flexible barrier member 12. As the pellets are cured or caused to become chemically active, the pellets expand, causing the movable surfaces 18a, 18b of the flexible barrier member 12 to slide along the rod 20 in opposite directions. One end portion 18b of the flexible barrier member 12 moves until it abuts a pin head 30 formed at a distal end of the rod 20. The other end portion 18a slides along the rod 20 until its movement is stopped by the nut 22 supported by the opposite end of the rod 20.

In any of the embodiments discussed above, the flexible barrier member 12 can be secured in position by securing the neck portion 32 in place by adhesively coupling the neck portion 32 to the adjacent surface defining the opening 24. One of skill in the art will also appreciate that a portion of the outer surface of the flexible barrier member 12 can be coated with an adhesive which will permit the flexible barrier member 12 once in the desired position to adhere to adjacent surfaces.

It will also be appreciated by one of skill in the art that in the embodiments where the flexible barrier member 12 is filled with the reinforcement material 14, the flexible barrier member 12 can contain tiny slits or perforations that permit a small portion of the reinforcement material 14 to flow onto the exterior surface of the flexible member 12, thus, coating the exterior surface thereof with a small amount of the reinforcement material 14. During the curing stage, the reinforcement material 14 can become bonded to adjacent structures. Furthermore, it is possible that the reaction exotherm of the curing material could cause the barrier member 12 to melt and thereby either bond to the metal, or displace to permit adhesion of the curing material to the metal.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A method of reinforcing at least a portion of a structure, the method comprising:

providing a structure;

supporting a flexible barrier member along a portion of the structure for dividing the area of the structure into one or more sections; and filling one or more of the sections of the structure with a reinforcement material, wherein the flexible barrier member retains the reinforcement material in a desired location and wherein the reinforcement material substantially assists in increasing the strength and stiffness of the structure.

2. The method as defined in claim 1, wherein the flexible barrier member is a polymeric material.

3. The method as defined in claim 1, wherein the flexible barrier member is an inflatable membrane.

4. The method as defined in claim 1, wherein the flexible barrier member is fabricated of an adhesive material.

5. The method as defined in claim 3, wherein the inflatable membrane is inflated by filling the interior portion thereof with a reinforcement material.

6. The method as defined in claim 5, wherein the inflatable membrane is inflated by filling the interior portion thereof with a pumpable substance.

7. The method as defined in claim 5, wherein the reinforcement material filling the flexible barrier member is a heat activated material.

8. The method as defined in claim 5, wherein the reinforcement material filling the flexible barrier member is cured by a change in ambient conditions.

9. The method as defined in claim 5, wherein the reinforcement material filling the flexible barrier member comprises a multiplicity of pellets.

10. The method as defined in claim 3, wherein the inflatable membrane is inflated by filling the interior portion thereof with a gas or liquid substance.

11. The method as defined in claim 1, wherein the reinforcement material filling one or more sections of the structure being reinforced is a pumpable material.

12. The method as defined in claim 1, wherein the reinforcement material filling one or more sections of the structure being reinforced is a polymeric material.

13. The method as defined in claim 1, wherein the reinforcement material filling one or more sections of the structure being reinforced is a heat activated material.

14. The method as defined in claim 1, wherein the reinforcement matter is a two component substance reactive at ambient conditions.

15. The method as defined in claim 1, wherein the reinforcement material filling one or more sections of the structure being reinforced is cured by a change in ambient conditions.

16. The method as defined in claim 1, wherein the reinforcement material filling one or more sections of the structure being reinforced is a multiplicity of pellets.

17. A method of reinforcing at least a portion of a hollow cavity, the method comprising:

providing a structure defining a hollow cavity;

inserting a flexible barrier member within the cavity for dividing the cavity into one or more sections; and filling one or more sections of the cavity with a reinforcement material wherein the reinforcement material substantially assists in increasing the strength and stiffness of the structure.

18. A bladder system for reinforcing at least a portion of a structural member, comprising:

a flexible barrier member for dividing at least a portion of a structure to be reinforced into one or more sections; and a reinforcement material for filling one or more sections bounded by the flexible barrier member, wherein the sections filled by the reinforcement material can be internal or external of the flexible barrier member and wherein the reinforcement material substantially assists in increasing the strength and stiffness of the structure.

19. A bladder system, as defined in claim 18, wherein the structure being reinforced is a portion of an automobile frame.

20. The bladder system as defined in claim 18, wherein the reinforcement material filling one or more sections of the longitudinal structure is a pumpable material.

21. The bladder system as defined in claim 18, wherein the flexible barrier member is a polymeric material.

22. A bladder system for reinforcing at least a portion of a structure having an open center, comprising:

a flexible barrier member for dividing a cavity into one or more sections; and a reinforcement material for filling one or more sections bounded by the flexible barrier member, wherein the reinforcement material substantially assists in increasing the strength and stiffness of the structure.

* * * * *